BEST AVAILABLE COPY 1856,017

DEFENSIVE PUBLICATION

UNITED STATES PATENT OFFICE

Published at the request of the applicant or owner in accordance with the Notice of Apr. 11, 1968, 849 O.G. 1221. Identification is by serial number of the application and the heading indicates the number of pages of specification, including claims, and of sheets of drawing contained in the application as originally filed. The file of this application is available to the public for inspection; reproduction may be purchased for 30 cents per sheet.

Applications published under the Defensive Publication Program have not been examined as to the merits of alleged invention. The Patent Office makes no assertion as to the novelty of the disclosed subject matter.

PUBLISHED NOVEMBER 12, 1968

856 O.G. 336

586,927

NITROCELLULOSE-ETHYLENE/VINYL ACETATE GEL LACQUERS

William S. Gates, Wilmington, Del., assignor to Hercules Incorporated, Wilmington, Del., a corporation of Delaware

Filed Oct. 17, 1966. Published Nov. 12, 1968

Class 260—17

No Drawing. 7 Pages Specification

Gel lacquer formulations can be prepared comprising a mixture of 60 to 80% of an alcohol-soluble nitrocellulose and 40 to 20% of an ethylene-vinyl acetate copolymer in a liquid phase comprising a mixture of an aliphatic alcohol and an aromatic hydrocarbon. The alcohol-soluble nitrocellulose includes any nitrocellulose having a maximum of about 11.5% nitrogen and a viscosity characteristic up to about 60 seconds, preferably about 6 seconds or less. The vinyl acetate copolymer can be any such copolymer containing at least 36% vinyl acetate and preferably 36 to 42% vinyl acetate. Such copolymers are readily compatible with nitrocellulose. The alcohol-hydrocarbon mixture is a lean solvent for the nitrocellulose and consists of 68 to 72 parts by weight of an aliphatic alcohol and 32 to 28 parts by weight of an aromatic hydrocarbon. A preferred lean solvent mixture consists of 70 parts isopropyl alcohol and 30 parts toluene.

In preparation of the lacquer, the lean solvent mixture is heated to about 70° C. and the nitrocellulose copolymer mixture is added with agitation until dissolution is complete and a homogeneous solution is achieved. The mass is then permitted to cool to room temperature whereupon gelation takes place. To apply such a lacquer to a substrate, the lacquer is heated until it is flowable and applied to the substrate, usually by hot dipcoating.